United States Patent
Steffan et al.

(10) Patent No.: US 6,512,842 B1
(45) Date of Patent: Jan. 28, 2003

(54) COMPOSITION BASED ASSOCIATION ENGINE FOR IMAGE ARCHIVAL SYSTEMS

(75) Inventors: Paul J. Steffan, Elk Grove, CA (US); Allen S. Yu, Fremont, CA (US)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/288,938

(22) Filed: Apr. 9, 1999

(51) Int. Cl.[7] .................................. G06K 9/00

(52) U.S. Cl. ........................ 382/149; 382/147

(58) Field of Search ................. 382/149, 141, 382/145, 147, 162, 225, 305, 274; 707/1–2; 348/86, 87, 125, 126

(56) References Cited

U.S. PATENT DOCUMENTS

| 5,446,255 A | * | 8/1995 | Blondy et al. | ......... 219/121.54 |
| 5,913,205 A | * | 6/1999 | Jain et al. | ....................... 707/2 |
| 6,091,846 A | * | 7/2000 | Lin et al. | ..................... 382/145 |
| 6,246,787 B1 | * | 6/2001 | Hennessey et al. | ......... 382/141 |

* cited by examiner

Primary Examiner—Leo Boudreau
Assistant Examiner—Kanji Patel

(57) ABSTRACT

A method of analyzing defect images in a semiconductor manufacturing process wherein descriptors are assigned to images of defects caught during scanning of an inspection wafer. The images, assigned descriptors and linkage data are stored in a relational database. An operator can select an image to analyze and the review station assigns descriptors to the selected image and the database is searched for images having the assigned descriptors.

5 Claims, 2 Drawing Sheets

COMPOSITION BASED ASSOCIATION ENGINE FOR IMAGE ARCHIVAL SYSTEMS

BACKGROUND OF THE INVENTION

1. Field of the Invention

This invention relates generally to the manufacturing of high performance semiconductor devices. More specifically, this invention relates to the manufacture and testing of high performance semiconductor devices. Even more specifically, this invention relates to the manufacture and testing of high performance semiconductor devices using an image archival system to search for related images.

2. Discussion of the Related Art

In order to remain competitive, a semiconductor manufacturer must continuously increase the performance of the semiconductor integrated circuits being manufactured and at the same time, reduce the cost of the semiconductor integrated circuits. Part of the increase in performance and the reduction in cost of the semiconductor integrated circuits is accomplished by shrinking the device dimensions and by increasing the number of circuits per unit area on an integrated circuit chip. Another part of reducing the cost of a semiconductor chip is to increase the yield. As is known in the semiconductor manufacturing art, the yield of chips (also known as die) from each wafer is not 100% because of defects during the manufacturing process. The number of good chips obtained from a wafer determines the yield. As can be appreciated, chips that must be discarded because of a defect or defects increases the cost of the remaining usable chips because the cost of manufacturing must be amortized over the remaining usable chips.

A single semiconductor chip requires numerous process steps during manufacturing. These steps include oxidation, etching, metallization and wet chemical cleaning. Typically these process steps involve placing the wafer on which the semiconductor chips are being manufactured into different tools during the manufacturing process. The optimization of each of these process steps requires an understanding of a variety of chemical reactions and physical processes in order to produce high performance, high yield circuits. The ability to view and characterize the surface and interface layers of a semiconductor chip in terms of their morphology, chemical composition and distribution is an invaluable aid to those involved in research and development, process, problem solving, and failure analysis of integrated circuits. A major part of the analysis process is to capture defects and to analyze them completely to determine what caused the defects and to eliminate the cause.

In order to be able to quickly resolve process or equipment issues in the manufacture of semiconductor products, a great deal of time, effort and money is being expended by semiconductor manufacturers to capture and classify silicon based defects. Once a defect is caught and properly described and classified, work can begin to resolve the cause of the defect and to eliminate the cause of the defect. The biggest problem that faced semiconductor manufacturers was the inability of human inspectors to uniformly classify all defects consistently and without error. This problem was solved by the development of Automatic Defect Classification (ADC) systems.

One system for automatically classifying defects consists of the following methodological sequence. Gather a defect image from a review station. View the defect image and assign values to elemental descriptor terms called predicates that are general descriptors such as roundness, brightness, color, hue, graininess, etc. Assign a classification code to the defect based upon the values of all the predicates. A typical ADC system can have 40 or more quantifiable qualities and properties that can be predicates. Each predicate can have a specified range of values and a typical predicate can have a value assigned to it between 1 and 256. A value of 1 indicates that none of the value is present and a value of 256 indicates that the quality represented by the predicate is ideal. For example, a straight line would have a value of 1 for the predicate indicating roundness, whereas a perfect circle would have a value of 256 for the same predicate.

The classification code for each defect is determined by the system from the combination of all the predicate values assigned to the defect. The goal of the ADC system is to be able to uniquely describe all the defect types, in such a manner that a single classification code can be assigned to a defect which has been differentiated from all other defect types. This is accomplished by a system administrator who trains an artificial intelligence system to recognize various combinations and permutations of the 40 or more predicates to assign the same classification code to the same type of defect. This would result in a highly significant statistical confidence in the probability that the defect, and all other defects of the same type or class, will always be assigned the same classification code by the ADC system. These predicate values from the ADC system are stored in a database.

The current trend for semiconductor manufacturers is for increasing reliance on large integrated databases to provide analytical insight and yield prediction. These huge databases consist of quantitative data collected at various process modules in the manufacturing sequence as well as images of various features, such as defects alignment marks, focus matrices, etc., which provide a pictorial reference to problems or critical features. Currently the image data storage space utilization is superceding the data storage space at a rate of up to an order of magnitude more of total used storage space. Typically, a current database would have 80 GB consisting of 60–70 GB of image based information and 1–20 GB of data based information with the trend moving toward higher non-data based storage with video and sound becoming important components.

In the typical database most data is stored relationally, such that one can search the entire database for other examples exhibiting the same or similar characteristics of various parameters. While this is true for data based information, that is, lot numbers, critical dimensions, thicknesses, dates, operators, machines etc., this is virtually uniformly untrue for image-based data. The image itself may be linked to a certain defect or location at a certain layer of a certain lot, which can be relationally addressed, but information stored in the image is not retrievable relationally. For example, one can not retrieve all images having a red foreground with a repetitive dense pattern containing a small black defect with a halo using current storage methods.

Images have been described for purposes of ADC by a means of descriptors, which are measures of the various component parts that make the cohesive whole of an image. A typical descriptor can be color, roundness, brightness, intensity, contrast, repetitiveness, density, etc. These descriptive elements are typically used for comparison purposes with certain thumbprint values that have been generated within the ADC schema for classification purposes, and once a classification is determined the generated values are discarded. The problem with this method is that the images cannot be searched.

SUMMARY OF THE INVENTION

According to the present invention, the foregoing and other objects and advantages are attained by a method of analyzing defect images in a semiconductor manufacturing process wherein descriptors are assigned to images of defects.

In accordance with an aspect of the invention a production lot of wafers through a manufacturing a manufacturing process, scanning a selected wafer for defects and sending location information to a defect management system. The images of the defects are analyzed in an analysis tool that assigns descriptors to the image. The defect management system stores images, the assigned descriptors and linkage data in a database.

In accordance with another aspect of the invention a selected image is reviewed at a review station, which assign descriptors to the selected image that describe a desired feature of the selected image that is to be analyzed.

In accordance with another aspect of the invention the database is searched for images having descriptors assigned to the selected image.

In accordance with still another aspect of the invention the review station assigns refined descriptors to the selected image and the database is searched for images having the refined descriptors assigned to the selected image.

The described method thus effectively provides a method of analyzing defect images in a semiconductor manufacturing process wherein descriptors are assigned to images of defects whereby the images can be searched in a relational database.

The present invention is better understood upon consideration of the detailed description below, in conjunction with the accompanying drawings. As will become readily apparent to those skilled in the art from the following description, there is shown and described an embodiment of this invention simply by way of illustration of the best mode to carry out the invention. As will be realized, the invention is capable of other embodiments and its several details are capable of modifications in various obvious aspects, all without departing from the scope of the invention. Accordingly, the drawings and detailed description will be regarded as illustrative in nature and not as restrictive.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiments when read in conjunction with the accompanying drawings, wherein:

DETAILED DESCRIPTION

Reference is now made in detail to specific embodiments of the present invention which illustrate the best mode presently contemplated by the inventors for practicing the invention.

Figure 1:
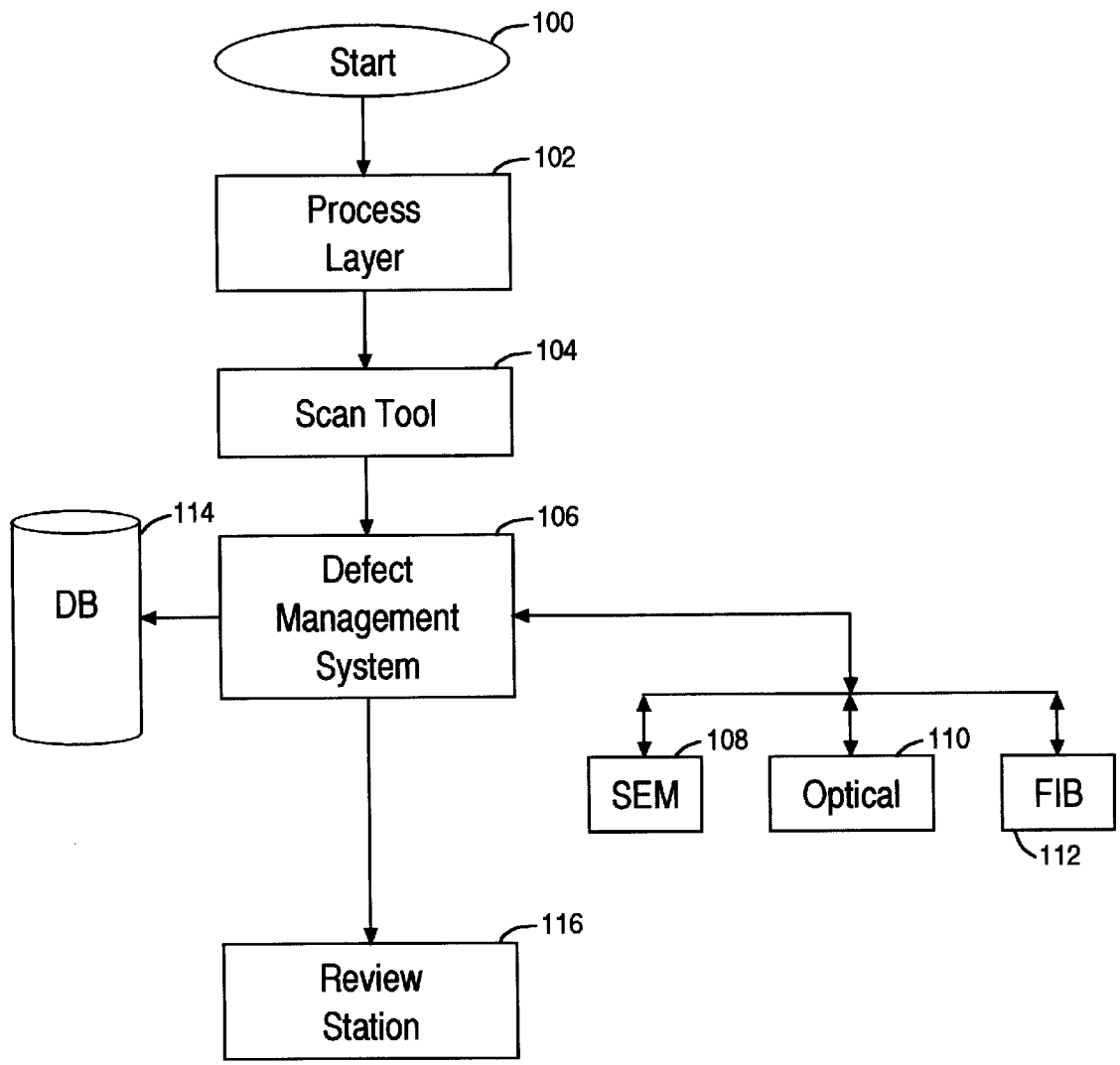
FIG. 1 is a typical method of capturing defects in a scan tool, analyzing the defects in various analysis tools and storing the image data in a database.

FIG. 1 is a typical method of capturing, analyzing and storing defect information in a typical semiconductor manufacturing process. A production lot of wafers is processed at one time. The manufacturing process typically involves the processing of multiple layers, however the processing of only one layer will be described herein. The process for a layer starts at 100 and the layer of the wafer is processed at 102. After the layer is processed, a selected wafer from the production lot is placed in a scan tool at 104, which scans the wafer and captures defects by determining their locations. The defect location information is forwarded to a defect management system (DMS) at 106. To analyze the defects, the wafer is placed in one of several analysis tools such as the SEM 108 (scanning electron microscope), an optical tool 110, and a FIB 112 (fixed ion beam). The analysis tools use the location information from the scan tool that has been stored in the defect management system 106. In accordance with the current methodology, the analysis tools 108, 110 & 112 locate the defects using the location information, examine the defects at high magnification and classify the defects by assigning predicate values to the defect. The analysis tools send the assigned classification code to the defect management system 106. The classification codes and images of the defects are stored in the database 114 by the defect management system 106. An operator at a review station 116 can call up the classification codes and each image from the database 114 for review. However, the operator cannot search the images relationally. The operator would have to call each image and review them one at a time in order to find similar images or to find a feature of interest.

Figure 2:
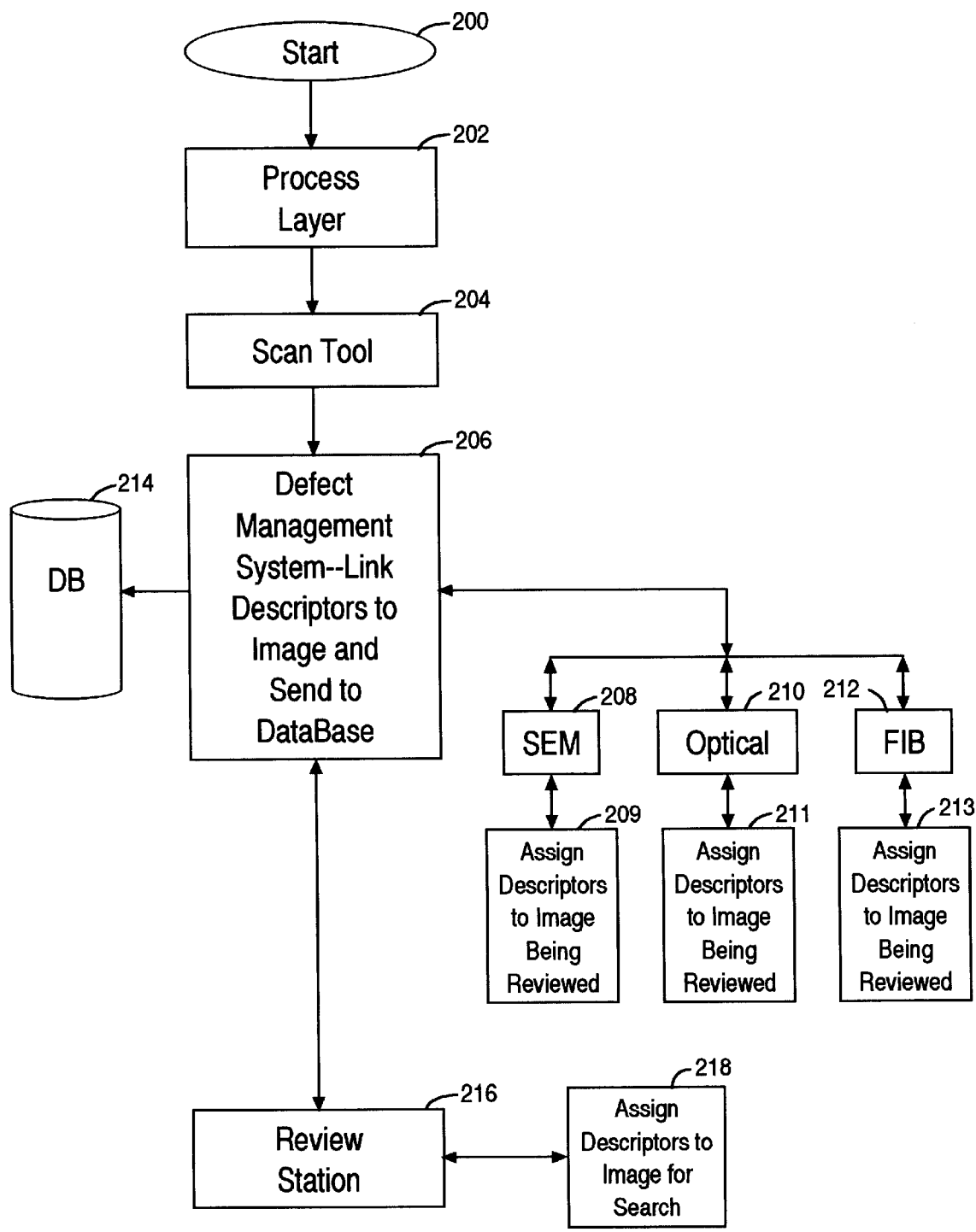
FIG. 2 is a method of capturing defects in a scan tool, analyzing the defects in various analysis tools, assigning descriptors to the images of the defects, storing image data in a database with links to the actual images and a review station that is able to assign descriptors to an image to be analyzed and compared to stored images.

FIG. 2 is a method of capturing, analyzing and storing defect information in accordance with the present invention. A production lot of wafer is processed at one time. The manufacturing process typically involves the processing of multiple layers; however the process of only one layer will be described herein. The process for a layer starts at 200 and the layer of the wafer is processed at 202. After the layer is processed, a selected wafer from the production lot is placed in a scan tool at 204, which scans the wafer and captures defects by determining their locations. The defect location information is forwarded to a defect management system (DMS) at 206. To analyze the defects, the wafer is placed in one of several analysis tools such as the SEM 208 (scanning electron microscope), and optical tool 210, and a FIB 212 (fixed ion beam). The analysis tools use the location information from the scan tool that has been stored in the defect management system 206. Each of the analysis tools 208, 210 & 212 assign descriptors at 209, 211 and 213, respectively, to the image being reviewed and forward the descriptor information and image to the defect management system 206. The defect management system 206 links the descriptor information to the image and stores the descriptor information and the image in a database 214. An operator at a review station 216 can call up an image for review. If the operator wishes to find similar images to the image being reviewed, the review station 216 assigns descriptors at 218 to the features of the defect that the operator wants to review and compare to other images in the database. This information is used to retrieve similar images from the database 214 via the defect management system 206. The operator at the review station 216 is then able to review similar images retrieved from the database 214. In addition, the operator can revise the descriptors to refine the search by narrowing the searched features or by broadening the searched features.

In summary, the results and advantages of the method of the present invention can now be more fully realized. The described method thus effectively provides a method of analyzing defect images in a semiconductor manufacturing process wherein descriptors are assigned to images of defects whereby the images can be searched in a relational database.

The foregoing description of the embodiments of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of analyzing defect images in a semiconductor manufacturing process, the method comprising:

sending a production lot of wafers through a manufacturing process;

scanning a selected wafer from the production lot of wafers for defects;

sending location information for defects caught during the step of scanning to a defect management system;

analyzing images of defects in an analysis tool wherein the analysis tool assigns descriptors, that measure the component parts that make the cohesive whole of an image, to each image and sends each image and the assigned descriptors to the defect management system;

storing each image and assigned descriptors with linkage data linking the assigned descriptors to each image in a database;

reviewing a selected image at a review station wherein the review station assigns descriptors to the selected image that describe a desired feature of the selected image that is to be analyzed; and searching the database for images having the same descriptors as the descriptors assigned to the selected image.

2. The method of claim 1 wherein the step of analyzing images of defects in an analysis tool includes selecting an analysis tool from the group of an SEM, optical tool, and an FIB.

3. The method of claim 2 further comprising refining the descriptors assigned to the selected image and searching the database for images having the refined descriptors.

4. The method of claim 3 further comprising reviewing the selected image and images retrieved from the step of searching the database for images having descriptors assigned to the selected image at the review station.

5. The method of claim 4 further comprising reviewing the selected image and images retrieved from the step of searching the database for images having the refined descriptors.

* * * * *